United States Patent [19]

Kato et al.

[11] Patent Number: 4,571,329
[45] Date of Patent: Feb. 18, 1986

[54] AMMONIA REDUCTION-DENITRATION PROCESS AND APPARATUS THEREFOR

[75] Inventors: Yasuyoshi Kato; Kunihiko Konishi; Masao Ohta, all of Kure, Japan

[73] Assignee: Babcock-Hitachi Kabushiki Kaisha, Tokyo, Japan

[21] Appl. No.: 639,933

[22] Filed: Aug. 13, 1984

[51] Int. Cl.$^4$ .......................... B01J 8/00; C01B 21/00
[52] U.S. Cl. .................................. 423/239; 422/170; 422/171
[58] Field of Search ............... 423/235, 239 R, 239 A; 422/170, 171

[56] References Cited

U.S. PATENT DOCUMENTS

| | | | |
|---|---|---|---|
| 4,046,888 | 9/1977 | Maeshima | 423/239 |
| 4,048,112 | 9/1977 | Matsushita | 423/239 |
| 4,197,375 | 6/1979 | Brown | 423/239 |
| 4,220,632 | 9/1980 | Pence | 423/239 |
| 4,314,913 | 2/1982 | Derrien | 423/239 |

*Primary Examiner*—John F. Niebling
*Attorney, Agent, or Firm*—Beall Law Offices

[57] ABSTRACT

An ammonia reduction-denitration process for exhaust gases containing $NO_x$ consisting mainly of $NO_2$, and an apparatus therefor are provided, which process comprises treating the exhaust gases with ammonia using a catalyst which is active to both a reaction of $(NO_2 + NH_3 \rightarrow N_2 + N_2O + H_2O)$ and a reaction of $(N_2O + NH_3 \rightarrow N_2 + H_2O)$ at an area velocity of 3 m/h or less and in a concentration ratio of $NH_3/NO_2$ of 1.3 or more. According to this process, it is possible to reduce $NO_2$ contained in the exhaust gases with ammonia at one stage without by-producing $N_2O$.

10 Claims, 10 Drawing Figures

AMMONIA REDUCTION-DENITRATION PROCESS AND APPARATUS THEREFOR

BACKGROUND OF THE INVENTION

1. Field of the Invention

This invention relates to a process for ammonia reduction-denitration of nitrogen oxides and an apparatus therefor, and more particularly it relates to a denitration process suitable for controlling the concentration of nitrous oxide (dinitrogen oxide, $N_2O$) by-produced at the time of denitration to a low level and also reducing nitrogen dioxide ($NO_2$) with ammonia, and an apparatus therefor.

2. Description of the Prior Art

The process of subjecting nitrogen oxides ($NO_x$) contained in exhaust gases to ammonia reduction with a catalyst into harmless nitrogen and water, i.e. the so-called catalytic ammonia reduction-denitration process, has a number of merits such as simple structure of apparatus, and has been practised for various purposes such as denitration of exhaust gases from combustion apparatus e.g. large scale boilers. Further, as the catalyst used for the above process, those composed mainly of oxides of titanium (Ti), vanadium (V), tungsten (W), molybdenum (Mo), etc. and having superior performance and life together have been practically used.

However, according to the studies of the present inventors, it has been clarified that the denitration process using the above catalysts is effective in the case where the nitrogen oxides consist of nitrogen monoxide (NO) or in the case where they consist of 50% or more of NO and 50% or less of nitrogen dioxide ($NO_2$), but the process is not so effective in the case where they consist mainly of $NO_2$ or in the case where they contain nitrous oxide ($N_2O$). This will be explained referring to the accompanying drawings.

FIG. 1 shows results obtained when an exhaust gas having a proportion of $NO_2$ in $NO_x$ of 80% (gas composition: $NO_2$ 800 ppm, NO 200 ppm, $NH_3$ 1,500 ppm, $O_2$ 20%, $H_2O$ 2%) was subjected to $NH_3$ reduction in the presence of conventional catalysts. In this figure, numeral 1 represents the case of $TiO_2$-$Co_2O_3$ catalyst and 2 represents the case of $TiO_2$-$V_2O_5$. As apparent from this figure, it is true that $NO_2$ and NO in the exhaust gas can be reduced, but on the other hand, $N_2O$ is by-produced in a large amount, so that the substantial denitration performance is low. Thus, when the $NH_3$ reduction-denitration process is applied to nitrogen oxides consisting mainly of $NO_2$, removal of $N_2O$ by-produced raises a serious problem.

Further, FIG. 2 shows results obtained when $N_2O$ (gas composition: $N_2O$ 1,000 ppm, $NH_3$ 1,000 ppm, $O_2$ 20%, $H_2O$ 2%) was subjected to $NH_3$ reduction in the presence of conventional denitration catalysts (numerals 1 and 2 in this figure represent the same catalysts as the above and 3 represents $TiO_2$-$WO_3$ catalyst). As apparent from this figure, conventional denitration catalysts are not only inert to $NH_3$ reduction of $N_2O$, but also contrarily have a tendency of by-producing $N_2O$. Thus, when $N_2O$ is contained beside NO or $NO_2$ as $NO_x$ in the exhaust gas, $N_2O$ remains as it is; hence in this case, too, removal of $N_2O$ raises a serious problem.

The above-mentioned properties of conventional type catalysts have never been known, and the reason is considered as follows: the analytical method of $N_2O$ is so difficult that $N_2O$ by-produced in the denitration reaction has not been studied and the evaluation of the denitration performance has been directed mainly to NO. Thus, no example of $NH_3$ reduction of $N_2O$ has so far been attempted, and naturally any catalyst which is highly active to the reaction has never been found.

Any of exhaust gases from nitric acid plant, metal-acid washing factory, nitrate-thermal decomposition furnace, etc. contain a high concentration of nitrogen oxides $NO_x$ consisting mainly of $NO_2$, and various processes for removing $NO_x$ have been studied from the viewpoint of countermeasure to public pollution or prevention of its effect on succeeding equipments. Among these processes, an alkali-washing process has now most often been practiced, but this process offers problems that the percentage of $NO_x$ removed is low and waste water treatment is required. Thus, development of a simple dry treatment process has been desired such as a catalytic ammonia reduction-denitration process yielding good results in the boiler flue gas denitration process.

However, when the catalytic ammonia reduction-denitration process is applied to the above exhaust gas, there is raised a problem that $N_2O$ is by-produced in a large amount; hence such an application cannot be a practical process. This is due to the fact that most of $NO_x$ in the above exhaust gas is in the form of $NO_2$ and in this respect, it has different properties from those of the boiler flue gas consisting mainly of nitrogen monoxide (NO). Namely, according to the study results of the present inventors, the reaction of $NO_2$ with $NH_3$ proceeds by the medium of elementary reactions expressed by the following equations (1), (1') and (2) and is collectively expressed by the following equation (3):

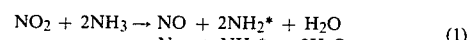
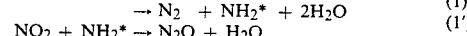
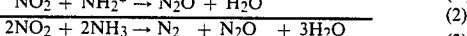
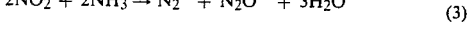

$$\begin{array}{ll} NO_2 + 2NH_3 \rightarrow NO + 2NH_2^* + H_2O & (1) \\ \phantom{NO_2 + 2NH_3} \rightarrow N_2 + NH_2^* + 2H_2O & (1') \\ NO_2 + NH_2^* \rightarrow N_2O + H_2O & (2) \\ \hline 2NO_2 + 2NH_3 \rightarrow N_2 + N_2O + 3H_2O & (3) \end{array}$$

Since this reaction mechanism does not resort to any catalyst species, it is considered that even if any known denitration catalysts are used, by-production of $N_2O$ according to the equation (2) cannot be avoided so long as the process of $NH_3$ reduction-denitration of $NO_2$ is employed.

Further, it has been said that when highly reducing metals are washed with acids or dissolved in nitric acid, $N_2O$ is generated in a large amount. As described above, a large number of plants need removal of $N_2O$ including potential $N_2O$-generation sources from which $N_2O$ is by-produced at the time of ammonia reduction-denitration; hence development of a process for selectively removing $N_2O$ has been earnestly desired.

Thus, the present inventors made various studies on a process for reducing $N_2O$, and as a result proposed a process of converting a part of $NO_2$ into NO by a catalytic thermal decomposition in advance of its denitration reaction to thereby adjust the composition of $NO_x$ in the exhaust gas to $(NO)/(total\ NO_x) \geqq 0.5$, followed by subjecting the resulting gas to conventional ammonia reduction-denitration reaction. This process is intended to have $NH_2$ consumed by NO as seen in the following equations to thereby inhibit the advance of the $N_2O$ by-production reaction of the above equation (2):

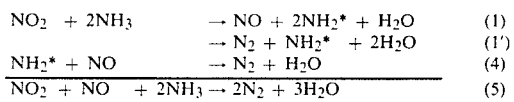

This denitration process in a two-stage manner makes it possible to inhibit the N$_2$O by-production down to a level as low as several ppm and also is superior in principle, but the structure of apparatus as well as its control are complicated; hence a problem of its practical use is raised. Thus, development of a denitration process capable of subjecting NO$_2$ to ammonia reduction at one stage as in the case of NO has been eagerly desired.

An object of the present invention is to provide a highly active catalyst for the reduction reaction of N$_2$O by means of NH$_3$ and a process for ammonia reduction-denitration of N$_2$O by the use of the catalyst.

Another object of the present invention is to provide a denitration process capable of subjecting NO$_2$ to NH$_3$ reduction at one stage without by-producing N$_2$O, and an apparatus therefor.

The present inventors have made studies on the activities of catalysts consisting of various metal oxides, upon the reaction of N$_2$O-NH$_3$ (see the following equation (6)):

As a result, it has been found that any of known catalysts comprising as their active component, oxides of transition metals such as vanadium (V), tungsten (W), chromium (Cr), manganese (Mn), cobalt (Co), etc. cannot promote the ammonia reduction reaction of N$_2$O, whereas compounds obtained by replacing a part or the total of alkali metals or alkaline earth metals contained in zeolites such as mordenite, Y type zeolite, etc. by iron (Fe) or hydrogen have a high activity of the ammonia reduction of N$_2$O.

SUMMARY OF THE INVENTION

Briefly the present invention is directed to an ammonia reduction-denitration process using a catalyst obtained by replacing the alkali metal or alkaline earth metal of natural or synthetic zeolites by hydrogen and/or iron to impart an activity for ammonia reduction of N$_2$O to the resulting material.

Further, the present invention is directed to an ammonia reduction-denitration process capable of denitrating NO$_2$ at one stage utilizing the fact that the above catalyst for ammonia reduction-denitration of N$_2$O is also active to the reaction of NO$_2$ with NH$_3$ (the above equation (3)). Namely, the present invention is directed to a process wherein using the above catalyst and selecting the reaction conditions so as to give specified values, the reduction reaction of NO$_2$ by means of ammonia and also the ammonia reduction reaction of N$_2$O formed by the above reaction are successively advanced within the same catalyst layer to thereby make it possible to reduce NO$_2$ with ammonia at one stage without byproducing N$_2$O.

DESCRIPTION OF THE PREFERRED EMBODIMENTS

It is important for the catalyst used in the present invention that Fe and/or H ions are incorporated into the skeleton structure of zeolite. Namely, the substitution ions contained in the hydrogen and/or iron substitution type zeolite catalyst according to the present invention have specific properties and exhibit chemically entirely different behaviors from those of ions contained in metal oxides alone or metal oxides supported on a carrier; hence the catalyst is also essentially different from iron oxide catalysts supported on alumina, silica or silica alumina.

In general, zeolites are aluminosicates having a complicated skeleton structure, as described in "Zeolites, their base and applications" edited by Hara et al and published from Kohdansha (1980), and expressed by the general formula xM$_2$/nO.yAl$_2$O$_3$.zSiO$_2$.mH$_2$O wherein M represents an optional metal element such as Na, K, Ca, etc. and n represents their valence. This metal element M is usually an alkali metal or an alkaline earth metal and these can be replaced by hydrogen, other transition metal cations or the like. The zeolites usable in the present invention may be any of those having the above properties, but those having a ratio of SiO$_2$/Al$_2$O$_3$ of 3 or more i.e. the so-called high silica zeolites are preferable from the viewpoint of the heat resistance and activity of catalyst, and concretely mordenite, clinoptilolite, faujasite, zeolite Y, etc. are preferred. Further, as to the method of hydrogen or iron substitution in the above zeolites, immersing in an acid solution and/or an iron salt solution, for example, is employed and also any methods which can attain the object may be employed in the present invention, so long as hydrogen or/and iron substitution type zeolites retaining the skeleton structure of zeolites are obtained thereby.

Typically, the catalyst of the present invention may be prepared by immersing a natural or synthesized zeolite such as mordenite, clinoptilolite, faujasite, etc. in hydrochloric acid, ammonium chloride (NH$_4$Cl) aqueous solution, ferric chloride (FeCl$_3$) aqueous solution or ferric nitrate Fe(NO$_3$)$_3$ aqueous solution, to replace the alkali metal or alkaline earth metal ion contained in the above zeolite by hydrogen or/and iron ion, followed by calcination at about 500° C. In this case, when a mixed aqueous solution of ammonium chloride and ferric chloride is used, a catalyst wherein the alkali metal or alkaline earth metal is replaced by hydrogen more than iron is obtained; when ferric nitrate aqueous solution is used, a catalyst wherein the metal is replaced almost by iron is obtained; and when a combination of ammonium chloride aqueous solution with ferric nitrate aqueous solution is used, a catalyst wherein the metal is replaced by iron more than hydrogen is obtained.

Figure 1:
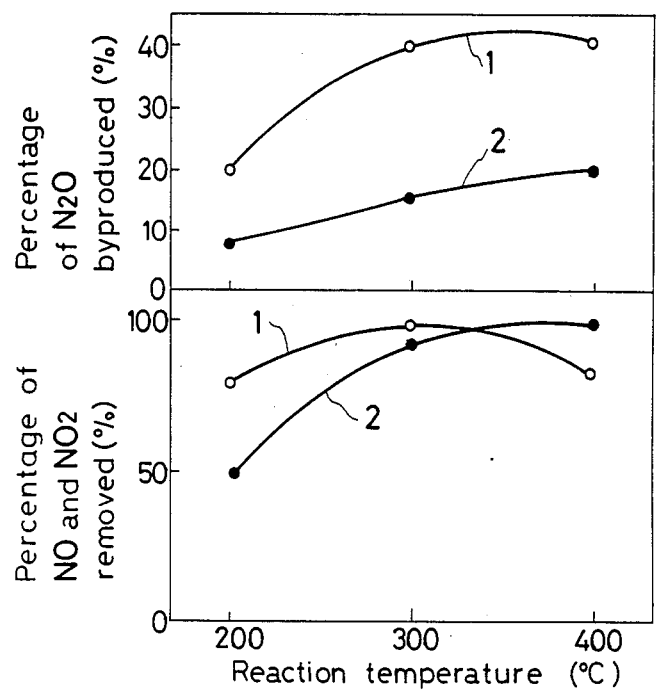
FIG. 1 shows a chart illustrating the performances of conventional catalysts relative to reduction of NO$_2$ with ammonia and the percentage of N$_2$O by-produced.
Figure 2:
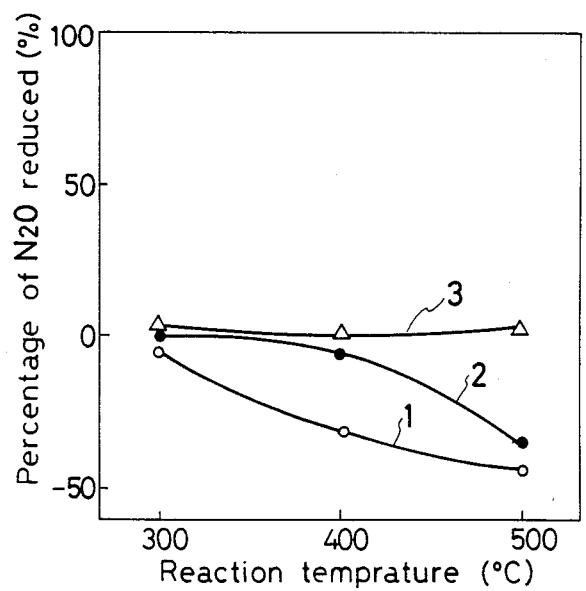
FIG. 2 shows a chart illustrating the performances of conventional catalysts relative to reduction of N$_2$O with ammonia.
Figure 3:
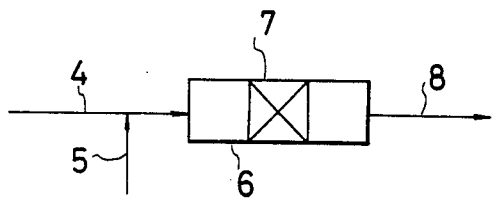
FIG. 3 shows a schematic view illustrating the denitration apparatus employed in the present invention.

Next, a flow sheet in the case where the catalyst according to the present invention is used for denitration of a $N_2O$-containing gas is shown in FIG. 3. An exhaust gas led through piping 4 has ammonia injected through piping 5, enters a catalyst layer 7 inside a reactor 6 wherein $N_2O$ contained in the gas is easily reduced by ammonia into harmless nitrogen and water, and is exhausted through piping 8.

Further, the principle in which $NO_2$ is denitrated into $N_2$ at one stage by the use of the above catalyst will be described below.

Figure 4:
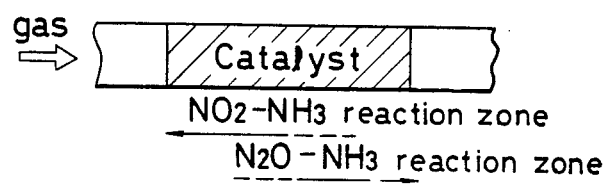
FIG. 4 shows a view illustrating the present invention in principle.

As shown in FIG. 4, when ammonia reduction of $NO_2$ is carried out employing a reactor having filled a large amount of a catalyst which is active to both the reaction of $NO_2$ with $NH_3$ of the above equation (3) and the ammonia reduction reaction of $N_2O$, and under a condition where ammonia is injected in large excess of a necessary amount for the reaction of the equation (3), then two reaction zones are formed inside the catalyst layer, as shown in the figure. Namely, in the vicinity of the inlet of the catalyst layer, the equation (3) having a higher reaction rate proceeds predominantly to form a first reaction zone wherein $N_2$, $N_2O$ and water are formed from $NO_2$ and $NH_3$, i.e. a reaction zone of $NO_2$—$NH_3$. Since the catalyst layer is elongated enough, $NO_2$ formed therein and $NH_3$ injected in excess and remaining without being consumed in the reaction of the equation (3) are reacted into $N_2$ and $H_2O$ by the function of the catalyst provided also with the activity to the $NH_3$ reduction of $N_2O$, as shown in the equation (6), to form a second reaction zone i.e. a zone of ammonia reduction of $N_2O$.

$$3N_2O + 2NH_3 \rightarrow 4N_2 + 3H_2O \quad (6)$$

As described above, when a catalyst species and the reaction conditions are suitably selected, it is possible to reduce $NO_2$ with ammonia into as far as $N_2$ and $H_2O$ using a single catalyst layer.

In the denitration process of the present invention, the catalyst and the reaction conditions are selected as follows:

First, the catalyst used should be active to both the reaction of $NO_2$—$NH_3$ of the equation (3) and the reduction reaction of $N_2O$ of the equation (6). Examples of such a catalyst are H and/or Fe substitution type zeolite catalysts, and particularly, the above-mentioned high silica zeolite catalysts such as mordenite, zeolite Y, etc. are preferred.

Secondly, as for the amount of $NH_3$ injected, it is necessary to select an amount of $NH_3$ sufficient for completing the two reactions of the equations (3) and (5). Thus, it is preferred to select the ratio of the amount of $NH_3$ injected, to the total amount of $NO_x$ contained in the gas (denoted as $NH_3/NO_x$) so as to give stoichiometrically 1.3 or more, particularly 1.6 or more.

Thirdly, it is necessary to fill the catalyst so that the above two reaction zones can be formed inside the catalyst layer. Thus, in the case of the above catalysts, it is preferred to select the area velocity AV (the amount of gas to be treated/the total outer surface area of catalyst) so as to give a value of 5 or less, particularly 3 or less.

When the above three conditions are satisfied, it is possible to reduce $NO_2$ with ammonia into $N_2$ and $H_2O$ without by-producing a large amount of $N_2O$.

Figure 5:
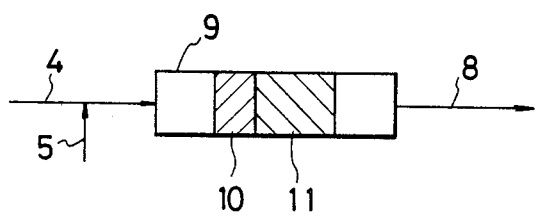
FIGS. 5 and 6 each show a view illustrating a reactor as an embodiment of the present invention.

As for the reactor employed in the present invention, a reactor as shown in FIG. 4 having filled therein a single catalyst which is active to both the reaction of $NO_2$—$NH_3$ and that of $N_2O$—$NH_3$ may be employed. Further, a reactor as shown in FIG. 5 may also be employed wherein a catalyst layer 10 having a superior activity to the reaction of $NO_2$—$NH_3$ of the equation (3) is provided on the upstream side of the reactor 9 and a catalyst layer 11 having a superior activity to the reaction of $N_2O$—$NH_3$ is provided on the downstream side thereof, whereby the total amount of catalyst used can be reduced. In this figure, numeral 4 represents a piping of gas to be treated; 5, a piping for ammonia injection; and 8, a piping of treated gas.

Figure 6:
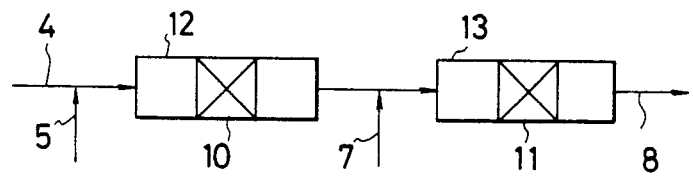

Next, FIG. 6 shows another flow sheet in the case where the catalyst of the present invention is used for denitration of a $NO_2$-containing gas. A $NO_2$-containing gas led through piping 4 has ammonia injected through ammonia-injecting piping 5, and is then led into a reactor 12 having a known denitration catalyst such as oxides of Ti, V, W and/or Mo filled therein, wherein it is reduced with ammonia into nitrogen and $N_2O$ and water according to the equation (3). The exhaust gas further has ammonia injected through ammonia-injecting piping 7 and then led into a reactor 13 having a catalyst 11 according to the present invention filled therein, wherein $N_2O$ is reduced with ammonia as shown in the above equation (6). Thus, even a gas consisting mainly of $NO_2$ can be subjected to denitration treatment without by-producing $N_2O$.

The present invention will be described in more details by way of Examples.

EXAMPLES 1~3

(Examples of Catalyst Preparation)

The respective powders of mordenite, faujasite and zeolite Y, each in an amount of 10 g, were immersed in 100 ml of a mixed aqueous solution of ammonium chloride and ferric chloride ($NH_4Cl$ 50 g/l, $FeCl_3$ 10 g/l) for 24 hours, followed by washing with 1 l of water, filtering and drying at 150° C. The resulting respective powders were shaped into tablets of 10 mm in diameter and 5 mm thick under a total pressure of 3 tons, followed by calcination at 500° C. for 2 hours to obtain catalysts of the present invention A, B and C.

EXAMPLES 4~6

(Examples of Catalyst Preparation)

Example 1 was repeated except that the mixed solution of ammonium chloride-ferric chloride was replaced by ferric nitrate ($Fe(NO_3)_2$) aqueous solution (amount used: 20 g/l, 58 g/l and 1 g/l), and mordenite powder (10 g in each case) was immersed in these solutions, to obtain catalyst of the present invention D, E and F.

EXAMPLES 7~9

(Examples of Catalyst Preparation)

The respective powders of mordenite, faujasite and zeolite Y (each 10 g) were immersed in an ammonium chloride aqueous solution (50 g/l) for 24 hours, followed by washing with 1 l of water, filtering, further immersing the resulting respective slurries in a ferric nitrate aqueous solution (1 g/l) and carrying out the same procedure as in Example 1, to obtain catalysts of the present invention G, H and I.

COMPARATIVE EXAMPLES 1~6

(Preparation Examples of Comparison Catalysts)

Mordenite, faujasite and zeolite Y used in Examples 1~9 were made comparison catalysts 1, 2 and 3, respectively. Further, ferric nitrate (1 g) and water (3 ml) were added to the respective powders of α-$Al_2O_3$, silica alumina ($SiO_2$ 70 wt. %, $Al_2O_3$ 30 wt. %) and titanium oxide ($TiO_2$) (each 10 g) and the respective mixtures were kneaded in a mortar, followed by drying, shaping and calcination as in Example 1 to obtain comparison catalysts 4, 5 and 6.

Figure 7:
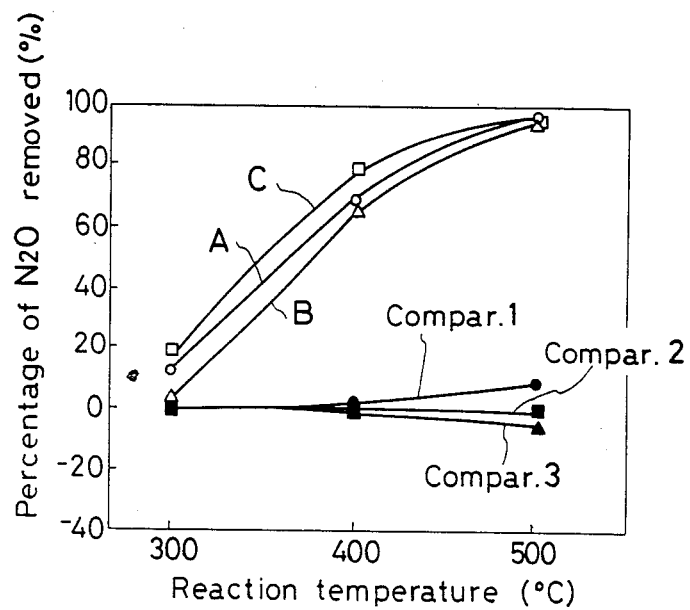
FIG. 7 shows a chart illustrating the performances of the catalyst of the present invention and a comparison catalyst relative to reduction of N$_2$O with ammonia.

The catalysts obtained in the above Examples and Comparative examples were respectively milled into 10 to 20 meshes, and using these milled materials, their activities to ammonia reduction reaction of $N_2O$ were observed under the following conditions:

(1) gas composition:
   $N_2O$: 1,000 ppm
   $NH_3$: 1,000 ppm
   $O_2$: 20%
   $H_2O$: 2%
   $N_2$: remainder
(2) Space velocity (SV): 10,000 h$^{-1}$
(3) Reaction temperature: 300°~500° C.
(4) $N_2O$ analytical method: infrared spectrophotometry FIG. 7 shows the respective performances of ammonia reduction of $N_2O$, of catalysts A, B and C of Examples 1~3 and comparison catalysts. In this figure, A, B and C represent catalysts of the present invention A, B and C, respectively and Comparison 1, Comparison 2 and Comparison 3 represent Comparison catalysts 1, 2 and 3, respectively. As seen from the results shown in this figure, the comparison catalyst containing iron oxide as an active component and the zeolite catalysts not subjected to hydrogen and iron substitution (Comparative examples 1~3) have no activity to ammonia reduction of $N_2O$, whereas any of the hydrogen and iron substitution zeolite catalysts A, B and C have a high activity to reduction of $N_2O$.

Further, the following Table 1 shows the percentages of $N_2O$ removed at 450° C. of catalysts of Examples 1~9 and Comparison catalysts 1~6, and the substitution percentages of hydrogen or iron based on the results of elemental analysis. As seen from this Table, when the alkali metal or alkaline earth metal contained in the zeolites is replaced by hydrogen or iron, the activity to the ammonia reduction of $N_2O$ is notably improved. Further, it is seen that when all of the exchangeable cations are not replaced by iron but replaced by both of iron and hydrogen, a high activity is exhibited.

TABLE 1

|  |  | Catalyst | Name of zeolite | Substitution percentage (%)* H | Substitution percentage (%)* Fe | Percentage of $N_2O$ removed at 450° C. (%) |
|---|---|---|---|---|---|---|
| Example | 1 | A | mordenite | 42 | 35 | 86 |
|  | 2 | B | faujasite | 51 | 29 | 84 |
|  | 3 | C | zeolite Y | 55 | 40 | 94 |
|  | 4 | D | mordenite | 4 | 84 | 75 |
|  | 5 | E | mordenite | 2 | 51 | 63 |
|  | 6 | F | mordenite | 2 | 37 | 21 |
|  | 7 | G | mordenite | 25 | 61 | 97 |
|  | 8 | H | faujasite | 20 | 71 | 93 |
|  | 9 | I | zeolite Y | 12 | 81 | 99 |
| Compar. Example | 1 | Compar. catalyst 1 | mordenite | 1 | 5 | 5 |
|  | 2 | Compar. catalyst 2 | faujasite | 0.5 | 6 | −2 |
|  | 3 | Compar. catalyst 3 | zeolite Y | <0.1 | <0.1 | 0 |
|  | 4 | Compar. catalyst 4 | — | — | — | −45 |
|  | 5 | Compar. catalyst 5 | — | — | — | −35 |
|  | 6 | Compar. catalyst 6 | — | — | — | −33 |

*Substitution percentage: Equivalent % of H and Fe to total M in $xM_2/nO.yAl_2O_3.zSiO_2.mH_2O$ According to Examples 1~9, $N_2O$ which could have never been reduced with ammonia can be denitrated by ammonia reduction. Further, $N_2O$ generated in the case where $NO_2$ is contained in a high proportion as in the case of exhaust gas from nitric acid plant, can be removed by means of the catalyst of the present invention.

Next, Examples of ammonia reduction-denitration of $NO_2$-containing gas by the use of the catalyst of the present invention will be described below.

EXAMPLE 10

Tablets of a H, Fe-mordenite catalyst obtained by replacing 42 equivalent % of Na, K and Ca contained in mordenite by hydrogen (H) and 35 equivalent % thereof by iron (Fe) were ground, followed by adjusting the particle size to 10~20 meshes. The resulting particles (50 ml) were filled in a quartz glass reaction tube of 30 mm in inner diameter, and a test of ammonia reduction of $NO_2$ was carried out under the following conditions to observe the percentage of $NO_2$ reduced and the percentage of $N_2O$ by-produced:

Test conditions:
(1) gas composition:
   $NO_2$: 1,000 ppm
   $NH_3$: 1,800 ppm ($NH_3/NO_2 = 1.8$)
   $O_2$: 20%
   $H_2O$: 2%
   $N_2$: remainder
(2) Reaction temperature: 450° C.
(3) Area velocity AV: 10, 7, 5, 3 and 1 m/h For the analysis of $NO_2$ and $N_2O$, a $NO_x$ meters according to chemiluminescence and infrared spectrophotometry were employed. The percentage of $NO_2$ reduced and the percentage of $N_2O$ by-produced are defined by the following equations:

Percentage of $NO_2$ reduced (%) =

$$\frac{\left(\begin{array}{c}NO_2 \text{ concentration at} \\ \text{inlet of catalyst layer}\end{array}\right) - \left(\begin{array}{c}NO_x \text{ concentration at} \\ \text{exit of catalyst layer}\end{array}\right)}{\left(\begin{array}{c}NO_2 \text{ concentration at} \\ \text{inlet of catalyst layer}\end{array}\right)} \times 100$$

Percentage of $N_2O$ by-produced (%) =

-continued $$\frac{\left(\begin{array}{c}\text{N}_2\text{O concentration at}\\ \text{exit of catalyst layer}\end{array}\right)}{\left(\begin{array}{c}\text{NO}_2 \text{ concentration at}\\ \text{inlet of catalyst layer}\end{array}\right)} \times 100$$

COMPARATIVE EXAMPLE 7

A test was carried out in the same manner as in Example 10 except that among the test conditions of Example 10, the $NH_3$ concentration was changed to 1,000 ppm ($NH_3/NO_2 = 1.0$).

Figure 8:
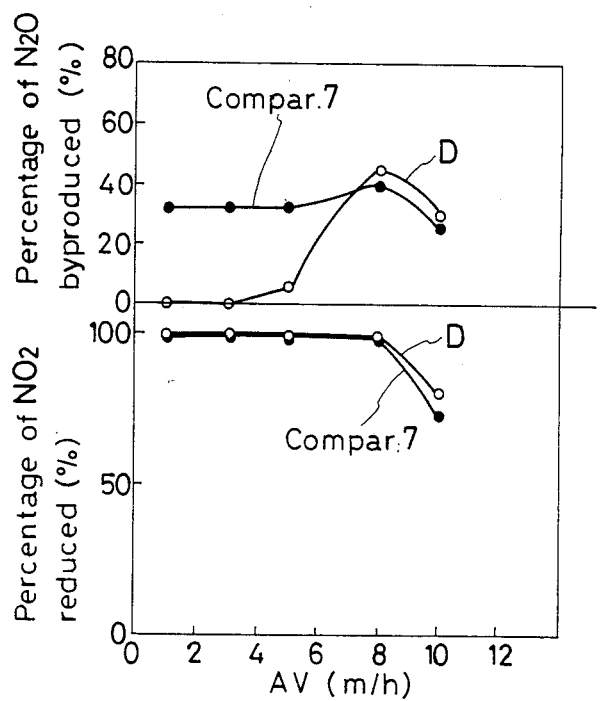
FIG. 8 shows a chart illustrating comparison results of Example 1 of the present invention and Comparative example 7.

FIG. 8 shows test results of Example 10 and Comparative example 7. In this figure, D represents the case of Example 10, and Comparison 7, that of Comparative example 7. As seen from this figure, the process of the present invention (Example 10) is very effective for reducing the amount of $N_2O$ by-produced at the time of ammonia reduction-denitration of $NO_2$. Further, it is seen that in the case of Example 10 where $NH_3$ concentration is high, as the AV is reduced (i.e. the contact time is increased), $NO_2$ reduction and increase in the amount of $N_2O$ by-produced, first occur, followed by $N_2O$ reduction due to the $NH_3$ reduction of $N_2O$, whereas in the case of Comparative example 7 where the $NH_3$ concentration is low, the $NH_3$ reduction of $N_2O$ cannot proceed, and to whatever extent the AV value is reduced, no $N_2O$ reduction is effected.

Further, as seen from the results of this figure, the AV value defining the present invention is preferably 5 or less, more preferably 3 or less.

EXAMPLE 11

A test was carried out in the same manner as in Example 10 except that in the test conditions of Example 10, AV = 1.0 m/h, and $NH_3$ concentration = 500~2,000 ppm.

Figure 9:
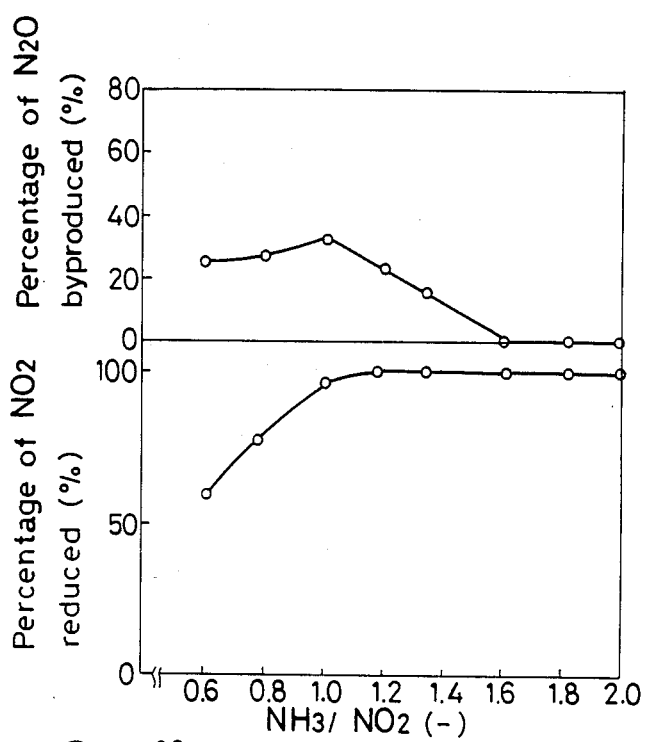
FIG. 9 shows a chart illustrating results of Example 11 of the present invention.

FIG. 9 shows the results of Example 11. As seen from this figure, it is preferred in order to inhibit $N_2O$ by-production that the ratio of $NH_3/N_2O$ be 4/3 or more, particularly 1.6 or more, in terms of stoichiometrical value.

COMPARATIVE EXAMPLE 8

A test was carried out in the same manner as in Example 10 except that a titanium oxide-vanadium pentoxide catalyst ($TiO_2$-$V_2O_5$ catalyst) generally used for the process of ammonia reduction-denitration of NO was used as catalyst.

Figure 10:
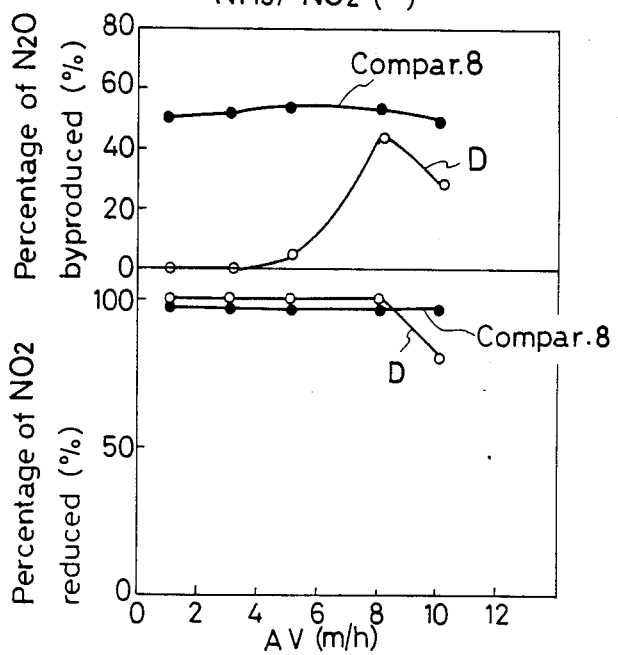
FIG. 10 shows a chart illustrating results of Example 10 of the present invention.

FIG. 10 shows results of Example 10 and Comparative example 8 for comparison. In this figure, D represents the case of Example 10 and Comparison 8, that of Comparative example 8. As seen from this figure, the process of the present invention wherein a catalyst having a high $N_2O$ decomposition percentage is used under specified conditions is also effective.

EXAMPLES 12~14

Tests were carried out in the same manner as in Example 10 except that in the test conditions of Example 10, AV was made a constant value of 3 m/h and the respective hydrogen and iron substitutes of mordenite, faujasite and zeolite Y were used as catalyst. The hydrogen and iron substitution percentages of the respective catalysts expressed in terms of equivalent % to the total amount of Na, K or Ca contained in the respective starting zeolites are shown in the following Table 2:

TABLE 2

| Name of catalyst | Percentage substitution (%) | |
| --- | --- | --- |
| | H | Fe |
| H and Fe substitution type Example 12 | 25 | 64 |
| H and Fe substitution type Example 13 | 35 | 45 |
| H and Fe substitution type Example 14 | 40 | 53 |

Table 3 collectively shows the performances of catalysts of Examples 12~14. As seen from the results, the hydrogen and iron substitution type zeolites yield good results in carrying out the present invention.

TABLE 3

| No. of Example | Percentage of $NO_2$ reduced (%) | Percentage of $N_2O$ by-produced (%) |
| --- | --- | --- |
| 12 | 99.7 | 0.1 or less |
| 13 | 99.6 | " |
| 14 | 99.9 | " |

As described above, according to the present invention, a catalytic ammonia reduction-denitration treatment of exhaust gases containing $NO_x$ consisting mainly of $NO_2$ has become possible.

What we claim is:

1. A process for the reduction of nitrogen oxides including nitrous oxide ($N_2O$) in an exhaust gas with ammonia ($NH_3$) wherein $N_2O$ is present in the exhaust gas or is created in said process by a reaction of ammonia reducing nitrogen dioxide ($NO_2$), said process comprising:
   contacting the exhaust gas with ammonia in the presence of a catalyst consisting of zeolite ion substituted with hydrogen and iron, said catalyst being able to:
   (a) catalyze the formation reaction of nitrogen ($N_2$), $N_2O$ and water from $NO_2$ and $NH_3$; as well as
   (b) catalyze the formation reaction of $N_2$ and water from $NH_3$ and said $N_2O$ created by the reaction in (a);
   wherein $NO_2$ conprises at least 50% by weight of said nitrogen oxides; and
   wherein the ratio of $NH_3$ to $NO_2$ is at least 1.3.

2. The process according to claim 1 wherein the ratio of $NH_3$ to $NO_2$ is at least 1.6.

3. A process according to claim 1, wherein said process is carried out at an area velocity of at least 5 m/h.

4. A process according to claim 1, wherein said process is carried out at an area velocity of at least 3 m/h.

5. A process according to claim 1, wherein said zeolite is selected from the group consisting of mordenite, clinoptilolite, faujasite and zeolite Y.

6. A process according to claim 1, wherein the substitution percentage of hydrogen and iron is in the range of 77 to 95%.

7. An apparatus for the reduction of nitrogen oxides including nitrous oxide ($N_2O$) in an exhaust gas with ammonia ($NH_3$), wherein $N_2O$ is present in the exhaust gas or is created in said process by a reaction of ammonia reducing nitrogen dioxide ($NO_2$), which apparatus comprises:

a reactor provided with a catalyst which is able to catalyze the formation reaction of nitrogen ($N_2$), $N_2O$ and water from $NO_2$ and $NH_3$, filled therein upstream and also provided with a catalyst consisting of a zeolite ion substituted with hydrogen and iron, said ion substituted zeolite catalyzing both the formation reaction of $N_2$, $N_2O$ and water from $NO_2$ and $NH_3$ and the formation reaction of $N_2$ and water from $N_2O$ and $NH_3$, filled therein downstream, said process being carried out in a ratio of $NH_3$ to $NO_2$ of at least 1.3.

8. An apparatus according to claim 7, wherein said process is carried out at an area velocity of 5 m/h or less.

9. An apparatus according to claim 7, wherein said catalyst catalyzing in the formation reaction of $N_2$, $N_2O$ and $H_2O$ from $NO_2$ and $NH_3$ is at least one selected from the group consisting of the oxides of Ti, V, W and Mo, and said zeolite is selected from the group consisting of mordenite, clinoptilolite, faujasite and zeolite Y.

10. An apparatus according to claim 7, wherein the substitution percentage of hydrogen and iron is in the range of 77 to 95%.

* * * * *